United States Patent
Zhang et al.

(10) Patent No.: US 10,248,254 B1
(45) Date of Patent: Apr. 2, 2019

(54) DISPLAY PANEL, DISPLAY DEVICE AND FORCE TOUCH METHOD

(71) Applicant: Xiamen Tianma Micro-Electronics Co., Ltd., Xiamen (CN)

(72) Inventors: Yan Zhang, Xiamen (CN); Shaoting Lin, Xiamen (CN)

(73) Assignee: XIAMEN TIANMA MICRO-ELETRONICS CO., LTD. (CN)

( * ) Notice: Subject to any disclaimer, the term of this patent is extended or adjusted under 35 U.S.C. 154(b) by 0 days.

(21) Appl. No.: 15/886,967

(22) Filed: Feb. 2, 2018

(30) Foreign Application Priority Data

Oct. 23, 2017 (CN) .......................... 2017 1 0993767

(51) Int. Cl.
*G06F 3/041* (2006.01)

(52) U.S. Cl.
CPC .. *G06F 3/0416* (2013.01); *G06F 2203/04105* (2013.01)

(58) Field of Classification Search
None
See application file for complete search history.

(56) References Cited

U.S. PATENT DOCUMENTS

2018/0046297 A1* 2/2018 Weng .................. G02F 1/13338

* cited by examiner

*Primary Examiner* — Christopher J Kohlman
(74) *Attorney, Agent, or Firm* — Tarolli, Sundheim, Covell & Tummino LLP (57) ABSTRACT

The present disclosure provides a display panel, a display device and a force touch method thereof. The display panel includes a plurality of force sensors disposed in a display area and a touch electrode including a plurality of touch electrode blocks. Each of the plurality of force sensors includes four force electrodes sequentially interconnected end-to-end, which are a first force electrode, a second force electrode, a third force electrode and a fourth force electrode. One or more of the plurality of touch electrode blocks each are frame-shaped electrodes and each of the plurality of force sensors corresponds to a respective one of the frame-shaped electrodes. Each of the frame-shaped electrodes is provided with a hollow area, and each of the plurality of force sensors is disposed in the hollow area of the respective frame-shaped electrode thereof. The display panel is applied in a display device.

19 Claims, 10 Drawing Sheets

DISPLAY PANEL, DISPLAY DEVICE AND FORCE TOUCH METHOD

CROSS-REFERENCE TO RELATED APPLICATIONS

The present application claims priority to Chinese Patent Application No. 201710993767.2, filed on Oct. 23, 2017, the content of which is incorporated herein by reference in its entirety.

TECHNICAL FIELD

The present disclosure relates to the field of display technologies and, in particular, to a display panel, a display device and a force touch method thereof.

BACKGROUND

At present, electronic devices in the market can usually be operated by touch control on the interface. When an operator touches the display panel with a finger, the display panel sends a signal to the electronic device. Some devices can detect the magnitude of the touch force via a resistive force sensor, that is, the magnitude of the touch force is achieved by detecting the change of the resistance in the force sensor.

However, the inventor has found that the force sensor provided on the display panel causes the border width of the display panel be increased.

SUMMARY

The present disclosure provides a display panel, a display device and a force touch method thereof, for reducing the border width of the display panel.

In a first aspect, the present disclosure provides a display panel. The display panel includes: a plurality of force sensors disposed in a display area, each of the plurality of force sensors including four force electrodes sequentially interconnected end-to-end, which are a first force electrode, a second force electrode, a third force electrode and a fourth force electrode; a touch electrode including a plurality of touch electrode blocks, wherein one or more of the plurality of touch electrode blocks are frame-shaped electrodes, and each of the plurality of force sensors corresponds to a respective one of the frame-shaped electrodes, each of the frame-shaped electrodes is provided with a hollow area, and each of the plurality of force sensors is disposed in the hollow area of the respective frame-shaped electrode.

In a second aspect, the present disclosure provides a display device including a display panel. The display panel includes: a plurality of force sensors disposed in a display area, each of the plurality of force sensors including four force electrodes sequentially interconnected end-to-end, which are a first force electrode, a second force electrode, a third force electrode and a fourth force electrode; a touch electrode including a plurality of touch electrode blocks, wherein one or more of the plurality of touch electrode blocks are frame-shaped electrodes, and each of the plurality of force sensors corresponds to a respective one of the frame-shaped electrodes, each of the frame-shaped electrodes is provided with a hollow area, and each of the plurality of force sensors is disposed in the hollow area of the respective frame-shaped electrode.

In a third aspect, the present disclosure provides a force touch method applied in a display panel. The display panel includes a plurality of force sensors disposed in a display area, each of the plurality of force sensors including four force electrodes sequentially interconnected end-to-end, which are a first force electrode, a second force electrode, a third force electrode and a fourth force electrode; a touch electrode including a plurality of touch electrode blocks, wherein one or more of the plurality of touch electrode blocks are frame-shaped electrodes, and each of the plurality of force sensors corresponds to a respective one of the frame-shaped electrodes, each of the frame-shaped electrodes is provided with a hollow area, and each of the plurality of force sensors is disposed in the hollow area of the respective frame-shaped electrode. The force touch method includes obtaining an output signal of the force sensors in a force touch stage.

Any one of the above technical solutions has the following beneficial effects.

The force sensor is disposed in the display area of the display panel, on the one hand, the force sensor does not occupy the non-display area, thereby effectively reducing the width of the border of the display panel to meet the user's requirements on a narrow border; on the other hand, when the user presses a certain position of the display area, the force sensor can directly sense the change of the electric signal, which avoids attenuation of the output signal value caused by a long wiring, and thus improving the sensitivity of the force sensor.

BRIEF DESCRIPTION OF DRAWINGS

In order to make the technical solutions in the embodiments of the present disclosure to be clearer, the accompanying drawings required for illustrating the embodiments will be briefly introduced in the following. The accompanying drawings merely show some embodiments of the present disclosure, and person skilled in the art may still obtain other accompanying drawings on the basis of the following accompanying drawings without creative efforts.

DESCRIPTION OF EMBODIMENTS

In order to make the purpose, technical solutions, and advantages of the embodiments of the present disclosure to be clearer, the technical solutions in the embodiments of the present disclosure are clearly and completely described in the following with reference to the accompanying drawings. Obviously, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that, the term "and/or" as used herein merely means an association relationship that describes relation of associated objects, which means that there may be three relationships. For example, "A and/or B" may represent three cases: only "A" is presented, both "A and B" are presented, and only "B" is presented. In addition, the symbol "/" as used herein generally means an "or" relation of the associated objects.

It should be understood that, although the force electrode may be described using the terms of "first", "second", "third", "fourth", etc., in the embodiments of the present disclosure, the force electrodes will not be limited to these terms. These terms are merely used to distinguish force electrodes from one another. For example, without departing from the scope of the embodiments of the present disclosure, a first force electrode may also be referred to as a second force electrode, similarly, a second force electrode may also be referred to as a first force electrode, a third force electrode may also be referred to as a fourth force electrode, etc.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via an intermediate element.

Figure 1:
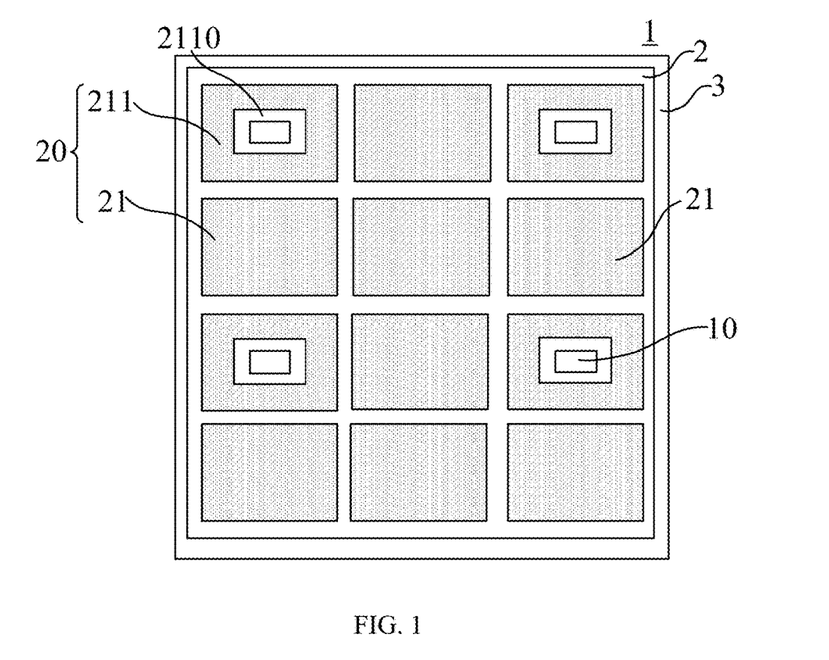
FIG. 1 is a structural schematic diagram of a display panel provided by an embodiment of the present disclosure.
Figure 2:
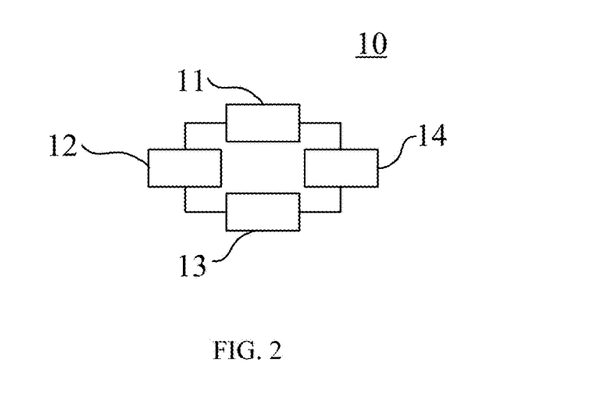
FIG. 2 is a structural schematic diagram of a force sensor provided by an embodiment of the present disclosure.

The present disclosure provides a display panel, as shown in FIG. 1 and FIG. 2, FIG. 1 is a structural schematic diagram of a display panel provided by an embodiment of the present disclosure, FIG. 2 is a structural schematic diagram of a force sensor provided by an embodiment of the present disclosure. In combination with FIG. 1 and FIG. 2, the display panel 1 includes a display area 2, and a non-display area 3 surrounding the display area 2.

Further, the display panel 1 includes: a plurality of force sensors 10 disposed in the display area 2, each of the force sensors 10 including a first force electrode 11, a second force electrode 12, a third force electrode 13 and a fourth force electrode 14 sequentially connected end to end; and a touch electrode 20 including a plurality of touch electrode blocks 21. One or more of the touch electrode blocks 21 are frame-shaped electrodes 211 corresponding to each force sensor 10, and each frame-shaped electrode 211 is provided with a hollow area 2110. Each force sensor 10 is disposed in the hollow area 2110 of a corresponding frame-shaped electrode 211.

In the related art, the force sensors are arranged in the non-display area of the display panel, which may increase the area occupied by the non-display area and thus is adverse to realization of a narrow border. In addition, the pressing position is relatively far from the position of the force sensor, the output signal has a relatively small value, and thus the sensitivity is relatively poor.

In an embodiment, the force sensor is disposed in the display area of the display panel, on the one hand, the force sensor does not occupy the non-display area, thereby effectively reducing the width of the border of the display panel to meet the user's requirements on a narrow border; on the other hand, when the user presses a certain position of the display area, the force sensor can directly sense the change of the electric signal, which avoids attenuation of the output signal value caused by a long wiring, and thus improving the sensitivity of the force sensor.

It should be noted that, as for the touch electrode, the hollow area can be disposed at any position of the frame-shaped electrode. In the present embodiment, the hollow area is disposed at the center position of the frame-shaped electrode, so as to achieve uniform touch sensitivity with respect of the entire periphery of the frame-shaped electrode.

Besides, the hollow area does not influence the sensitivity of the touch electrode for the following reasons.

The force sensor has a small size along a certain direction, which may be a micron size, whereas the size of the touch electrode block along the above-mentioned direction may be a millimeter size. That is, the area of the force sensor is approximately $\frac{1}{1000}$ or even $\frac{1}{10000}$ of the area of the touch electrode block, which has little influence on the touch sensitivity of the touch electrode block. For example, assuming that the area of the touch electrode is 4*4 mm$^2$, the area of the force sensor (the hollow area) is 20*20 μm$^2$, then the area of the force sensor (the hollow area) is $\frac{1}{40000}$ of the area of the touch electrode, and the touch area by the finger of a user is much larger than the above area, so it can be considered that the force sensor has little influence on the touch sensitivity of the touch electrode block.

Figure 3:
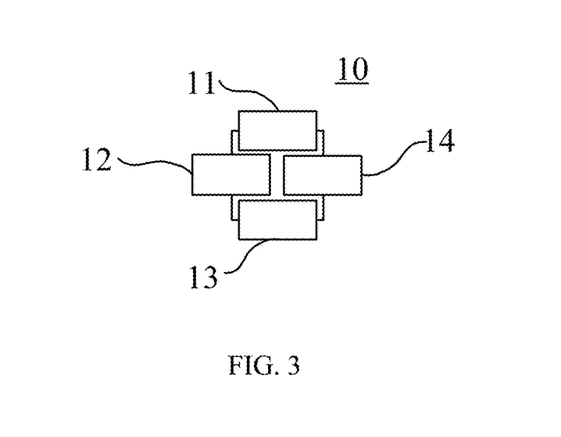
FIG. 3 is another structural schematic diagram of a force sensor provided by an embodiment of the present disclosure.

In addition, as an example, as shown in FIG. 3, FIG. 3 is another structural schematic diagram of a force sensor provided by an embodiment of the present disclosure, the smaller the hollow area (the area occupied by the force sensor), the smaller the distance between four force electrodes, so that in a relatively small range, the temperature changes of the first force electrode 11, the second force electrode 12, the third force electrode 13 and the fourth force electrode 14 are synchronous, thereby eliminating the influence on the deformation of the force electrode due to the temperature difference, and the accuracy of the output signal value is improved.

It should be noted that, for example, the number of the touch electrode blocks is 12 in FIG. 1, of which 6 touch electrode blocks are frame-shaped electrodes. In fact, the number of the touch electrode blocks on the display panel may be much larger than 12, and the number of the frame-shaped electrodes may be much larger than 6. The number of touch electrode blocks and the frame-shaped electrodes will not be limited in the present disclosure. In addition, the size and location of the frame-shaped electrode, the touch electrode block, and the touch electrode do not represent their size and location in the actual product.

In combination with the display panel shown in FIG. 1, the present disclosure provides a force touch method.

The force touch method includes: obtaining an output signal of the force sensor in a force touch stage.

In an embodiment, the force sensors may be evenly distributed on the display panel so as to make a signal output by the force sensors more accurate.

Figure 4:
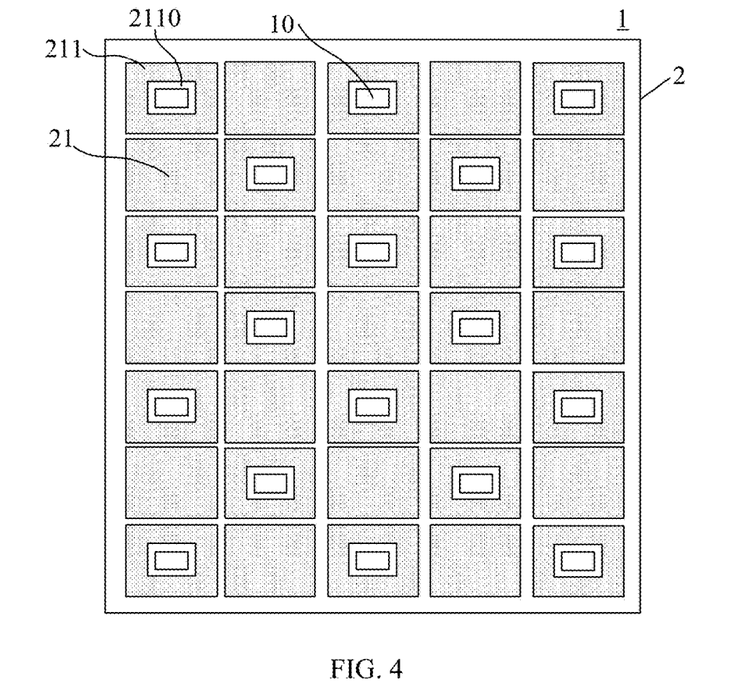
FIG. 4 is another structural schematic diagram of a display panel provided by an embodiment of the present disclosure.

Further, the force sensors may be evenly distributed on the display panel in multiple manners, for example, as shown in FIG. 4, FIG. 4 is another structural schematic diagram of a display panel provided by an embodiment of the present disclosure, the touch electrode blocks 21 are distributed in an array. In an odd row, an odd touch electrode block 21 is a frame-shaped electrode 211; and in an even row, an even touch electrode block 21 is a frame-shaped electrode 211. In FIG. 4, seven rows and five columns of touch electrode blocks 21 are provided, taking the touch electrode blocks provided in a first row as an example, a first touch electrode block, a third touch electrode block, and a fifth touch electrode block are frame-shaped electrodes, that is, in the first row, every other touch electrode block is provided with a frame-shaped electrode (force sensor), so that the force sensors can be evenly distributed on the display panel.

Optionally, in an embodiment, an even touch electrode block may be provided as the frame-shaped electrode in an odd row, and an odd touch electrode block may be provided as the frame-shaped electrode in an even row.

The hollow area 2110 of each frame-shaped electrode 211 is provided with the force sensor 10, that is, when the frame-shaped electrodes 211 are evenly distributed on the display panel 1, the force sensors 10 are uniformly distributed on the display panel 1. No matter which position of the display panel is pressed, it can be sensed by the force sensor, so that the sensing accuracy of the force sensor is improved.

Further, each touch electrode block may be provided as the frame-shaped electrode. The hollow area (the area occupied by the force sensor) is 1/1000 or even 1/10000 of the entire touch electrode block, which has little influence on the touch sensitivity of the touch electrode block. Therefore, when each touch electrode block is provided with the hollow area (force sensor), the sensitivity of the touch electrode will not be influenced, and the accuracy of the force sensor can be improved.

Figure 5:
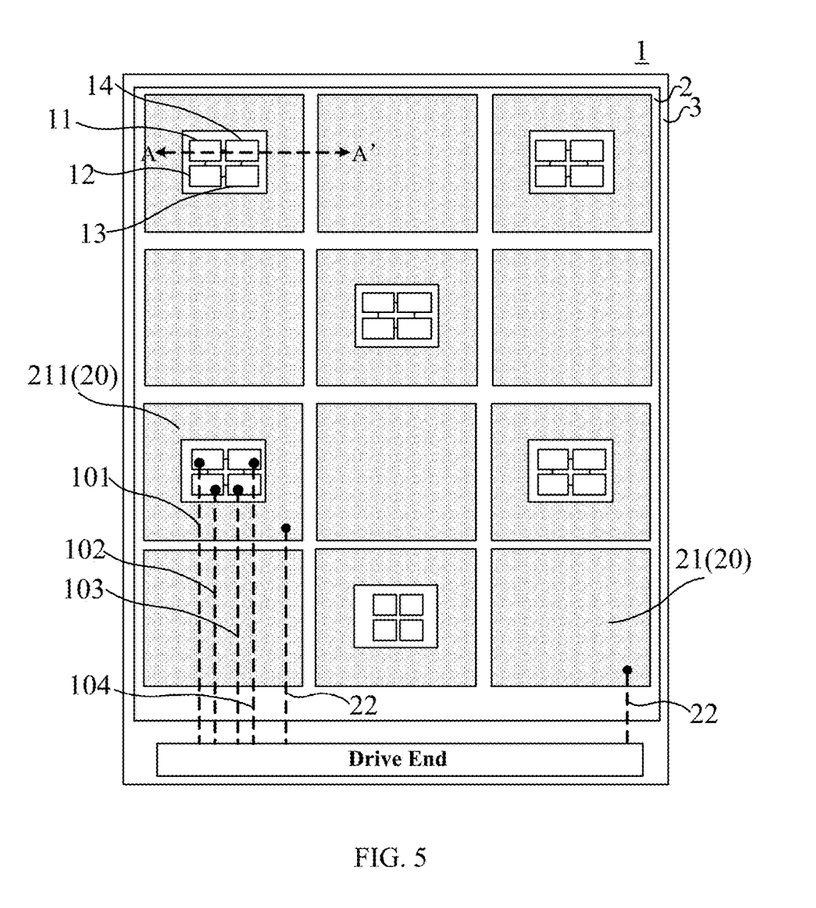
FIG. 5 is another structural schematic diagram of a force sensor provided by an embodiment of the present disclosure.
Figure 6:
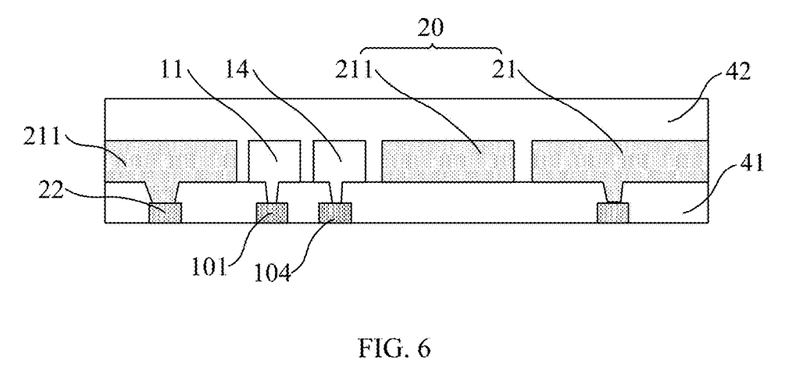
FIG. 6 is a cross-sectional view of AA' direction of FIG. 5 provided by an embodiment of the present disclosure.

In an embodiment, as shown in FIG. 5 and FIG. 6, FIG. 5 is another structural schematic diagram of a force sensor provided by an embodiment of the present disclosure, FIG. 6 is a cross-sectional view of AA' direction of FIG. 5 provided by an embodiment of the present disclosure. As shown in FIG. 6, the four force electrodes of each force sensor 10 are disposed in the same layer as the touch electrode 20. For example, in the present embodiment, the touch electrode 20 and the four force electrodes of the force sensor 10 may be disposed in a separate film layer. Optionally, the touch electrode 20 and the four force electrodes of the force sensor are disposed in a common electrode layer. The common electrode may be provided as common electrode blocks, one or more of the common electrode blocks may be provided with a hollow area, and four force electrodes of the force sensor is provided in the hollow area. During a display stage, all the common electrode blocks, and the four force electrodes disposed in the hollow area receive a common voltage signal; during a touch stage, one or more of the common electrode blocks may be multiplexed as the touch electrode, in this case, since the four force electrodes occupy a very small area, the four force electrodes may be or may not be multiplexed as the touch electrode, and the reason that the four force electrodes are not multiplexed as the touch electrode is described as above, which will not be further described herein. In addition, in an embodiment, since indium tin oxide (ITO) has good conductivity and transparency and does not block the emergent light, material of the common electrode may be ITO.

With further reference to FIG. 5, the display panel further includes: a plurality of touch signal lines 22, each of which corresponding to and being electrically connected with each touch electrode block 21 one to one; a first force-sensing signal line 101 electrically connected with the first force electrode 11, a second force-sensing signal line 102 electrically connected with the second force electrode 12, a third force-sensing signal line 103 electrically connected with the third force electrode 13, and a fourth force-sensing signal line 104 electrically connected with the fourth force electrode 14.

In combination with FIG. 6, the first force-sensing signal line 101, the second force-sensing signal 102, the third force-sensing signal line 103, and the fourth force-sensing signal line 104 are disposed in the same layer as the touch signal line 22. Since the force-sensing signal line and the touch signal line 22 are arranged in the same layer, on the one hand, film layers can be provided less, which makes the display panel lighter and thinner, on the other hand, the number of manufacturing processes are decreased, which improves the manufacture efficiency of the display panel and effectively saves cost. In addition, the four force electrodes of the force sensor 10 are disposed in the display area, and the corresponding wiring thereof, i.e., the four force-sensing signal lines are also disposed in the display area, which will not occupy the space of the non-display area surrounding the display area, further reducing the border width of the display panel.

In order to clearly express the film layer relation of the display panel in the present disclosure, based on the orientation shown in FIG. 6, from bottom to top, a first passivation layer 41 is disposed above a layer of the touch signal line 22 (force-sensing signal line layer), a layer of the touch electrode 20 (common electrode layer or force electrode layer) is disposed above the first passivation layer 41, and a second passivation layer 42 is disposed above the layer of the touch electrode 20.

It should be noted that, FIG. 5 is taken as an example, in order to clearly express the relation between the touch electrode and the touch signal line, FIG. 5 does not show the relation between all of the touch electrodes (the touch electrode blocks and the frame-shaped electrodes) and the touch signal line, but exemplarily shows the relation between one frame-shaped electrode and the touch signal line and the relation between one touch electrode block and the touch signal line. Similarly, FIG. 5 only shows the connection relation between the force electrodes of only one force sensor and the force-sensing signal line. For the connection relation of other components, FIG. 5 can be referenced.

It should be understood that, with further reference to FIG. 5, the display panel 1 further includes a drive end disposed in the non-display area 3. An end of the touch signal line not electrically connected with the touch electrode (touch electrode block and frame-shaped electrode) can be connected with the drive end, and the drive end includes a touch drive end. In a touch stage, the touch drive end provides a drive electric signal to the touch electrode (touch electrode block and frame-shaped electrode) via the touch signal line, the touch electrode (touch electrode block and frame-shaped electrode) senses the touching and feeds back a sensing electric signal to the touch drive end, then the touch drive end detects the touch position by analyzing the fed back sensing electric signal, and then outputs a corresponding touch operation. As for the force-sensing signal line, the drive end includes a force-sensing power source drive end and a force-sensing detection end. The first force electrode and the third force electrode are connected with the force-sensing power source drive end via their respective force-sensing signal lines so as to obtain drive signal provided by the force-sensing power source drive end, and the drive signal may be a voltage signal; the second force electrode and the fourth force electrode are connected with the force-sensing detection end via their respective force-sensing signal lines, so that when the force sensor is pressed, the force applied to the four force electrodes is fed back to the force-sensing detection end via the force-sensing signal line, and based on the detection, the force-sensing end outputs a corresponding signal.

The drive end can be construed as an integrated circuit IC including various ends for realizing respective functions, such as a touch drive end, a force-sensing power source drive end, and a force-sensing detection end.

Figure 7:
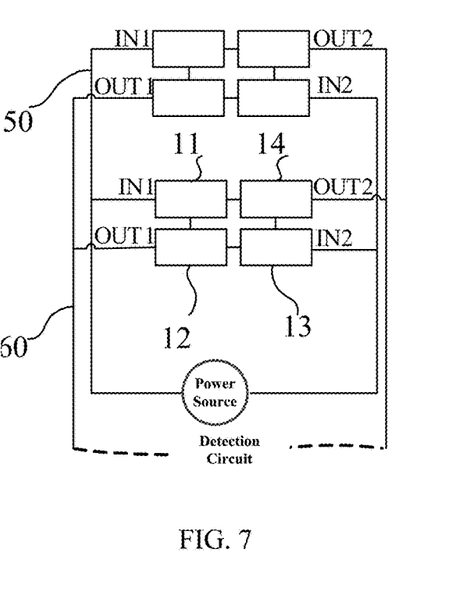
FIG. 7 is a structural schematic diagram showing connection relation of force sensors provided by an embodiment of the present disclosure.

As shown in FIG. 7, FIG. 7 is a structural schematic diagram of a connection relation of force sensors provided by an embodiment of the present disclosure, the display panel 1 further includes a voltage application circuit 50 and a detection circuit 60.

A first input end IN1 of the voltage application circuit 50 is electrically connected with the first force electrode 11, a second input end IN2 of the voltage application circuit 50 is electrically connected with the third force electrode 13, the voltage application circuit 50 is used to apply a voltage to the force sensor 10. In combination with the display panel shown in FIG. 5, the voltage application circuit 50 can be construed as a force-sensing power source drive end. In addition, the number of the force sensor can be the same as the number of the voltage application circuit, or it is also possible that, as shown in FIG. 7, one voltage application circuit provides a voltage to a plurality of force sensors. For sake of safety, and for eliminating static electricity generated by the force sensor (four force electrodes), the first end or the second end of the voltage application circuit may be connected with the ground.

A first output end OUT1 of the detection circuit 60 is electrically connected with the second force electrode 12, a second output end OUT2 of the detection circuit 60 is electrically connected with the fourth force electrode 14, the detection circuit 60 is used to detect the output signal of the force sensor 10. In combination with the display panel shown in FIG. 5, the detection circuit 60 can be construed as a force-sensing detection end.

Both the force sensors are disposed in the display area, while the voltage application circuit 50 and the detection circuit 60 are disposed in the non-display area.

Figure 8:
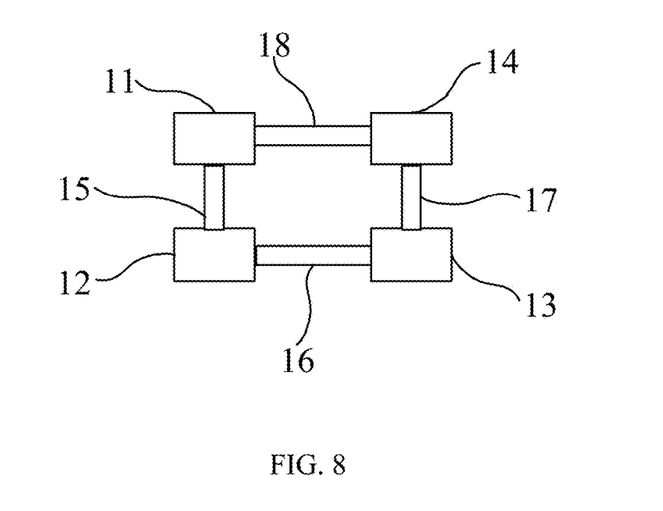
FIG. 8 is another structural schematic diagram of a force sensor provided by an embodiment of the present disclosure.
Figure 9:
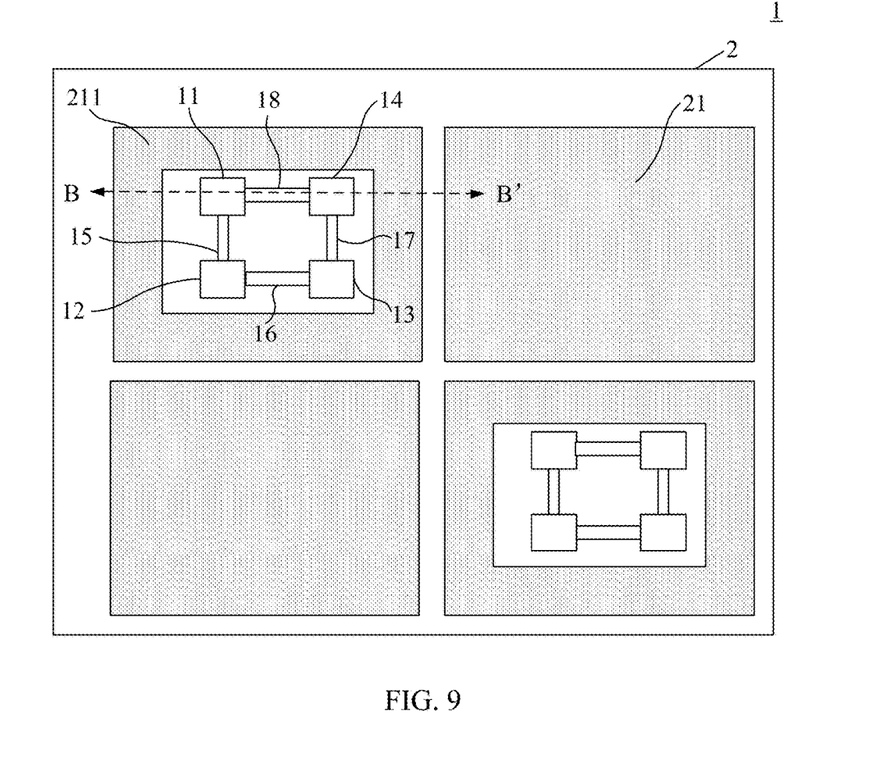
FIG. 9 is another structural schematic diagram of a display panel provided by an embodiment of the present disclosure.

In an embodiment, as shown in FIG. 8 and FIG. 9, FIG. 8 is another structural schematic diagram of a force sensor provided by an embodiment of the present disclosure, FIG. 9 is another structural schematic diagram of a display panel provided by an embodiment of the present disclosure. The display panel 1 further includes: a first electrode connecting line 15, via which the first force electrode 11 is connected with the second force electrode 12; a second electrode connecting line 16, via which the second force electrode 12 is connected with the third force electrode 13; a third electrode connecting line 17, via which the third force electrode 13 is connected with the fourth force electrode 14; and a fourth electrode connecting line 18, via which the fourth force electrode 14 is connected with the first force electrode 11.

Figure 10:
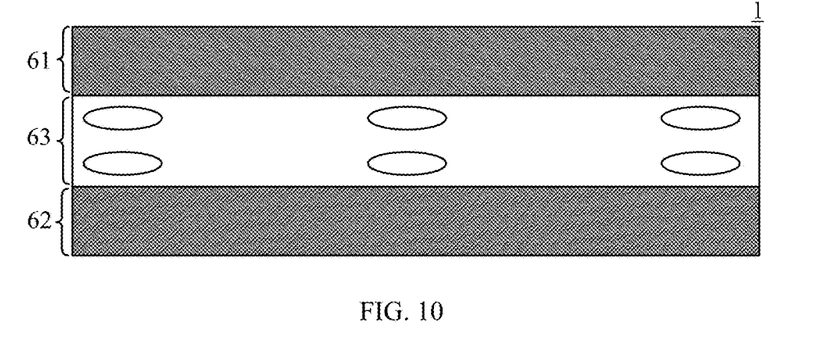
FIG. 10 is another structural schematic diagram of a display panel provided by an embodiment of the present disclosure.
Figure 11:
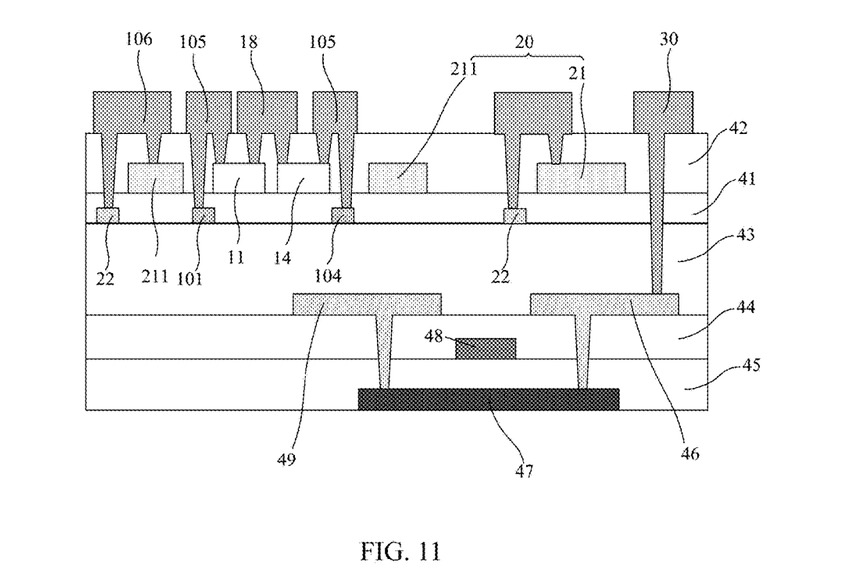
FIG. 11 is a cross-sectional view of BB' direction of FIG. 9 provided by an embodiment of the present disclosure.

Taking FIG. 10 and FIG. 11 as an example, FIG. 10 is another structural schematic diagram of a display panel provided by an embodiment of the present disclosure, FIG. 11 is a cross-sectional view of BB' direction of FIG. 9 provided by an embodiment of the present disclosure, and the display principle of the display panel will be briefly described in the following.

The display panel 1 may be a liquid crystal display panel. The liquid crystal display panel includes an array substrate 62, a color film substrate 61 arranged opposite to the array substrate 62, and a liquid crystal layer 63 between the array substrate 62 and the color film substrate 61. The array substrate 62 is provided with a plurality of sub-pixels (not shown) defined by a plurality of rows of gate lines (not shown) intersecting with a plurality of columns of data lines (not shown). Each of the sub-pixels is provided with a thin film transistor, a pixel electrode 30 and a common electrode. A gate electrode 48 of each thin film transistor is connected with a gate line, a source electrode 49 thereof is connected with a data line, and a drain electrode 46 thereof is connected with a pixel electrode 30. Under control of the corresponding gate line, the data line corresponding to the source electrode 49 of the thin film transistor charges/discharges to the pixel electrode 30 corresponding to the drain electrode 46 via the thin film transistor, and an electric field is formed between the pixel electrode 30 and the common electrode. During display of the liquid crystal display panel, i.e., in a display stage, the common electrode obtains a common voltage signal (usually a constant voltage signal), and an electric field is formed between the pixel electrode and the common electrode 30 to control rotation of liquid crystal molecules in the liquid crystal layer so as to achieve the display function. Moreover, it should be noted that, in the display stage, the frame-shaped electrode 211, the touch electrode block 21, and the four force electrodes 11-14 are all multiplexed as common electrode, and obtains a common voltage signal.

Further, with further reference to FIG. 11, in an embodiment, the display panel further includes a plurality of pixel electrodes 30. The first electrode connecting line 15, the second electrode connecting line 16, the third electrode connecting line 17 and the fourth electrode connecting line 18 may be disposed in the same layer as the pixel electrode 30. In this case, film layers can be provided less, so that the width of the display panel can be decreased and the cost can also be decreased.

Taking the orientation shown in FIG. 11 as a reference, the structure of each film layer will be briefly described. An active layer 47, an insulation layer 45, a gate electrode 48, an interlayer insulation layer 44, a drain electrode 46 (or source electrode 49), and a planarization layer 43 are sequentially formed from bottom to top. The drain electrode 46 is electrically connected with the pixel electrode 30. The structure of the film layers above the planarization layer 43 can refer to descriptions with respect to FIG. 6, which will not be further described herein.

The connection manner between the touch electrode and the corresponding touch signal line will be described in the following.

In a first connection manner, as shown in FIG. 6, the touch electrode 20 (touch electrode block 21 and frame-shaped electrode 211) can be electrically connected with the touch signal line 22 one to one via a through hole.

In a second connection manner, as shown in FIG. 11, the touch electrode 20 (touch electrode block 21 and frame-shaped electrode 211) can be electrically connected with the touch signal line 22 via a touch bridge line 106. Since the touch bridge line 106 and the pixel electrode 30 are provided in the same layer, material of the touch bridge line 106 may also be ITO. The touch electrode 20 is electrically with the touch signal line 22 by using the touch bridge line 106 as a bridge, it only requires to make an improvement with respect of the existing ITO layer (a layer of the pixel electrode 30), and there is no need to add an entire group of mask processes including exposing, etching, developing and so on. The manufacturing process is relatively mature, additional risks will not be brought, thus higher yield can be achieved, and manufacturing cost can be decreased.

Similarly, with further reference to FIG. 11, the force-sensing signal line may be electrically connected with the force electrode via a bridge. Taking the first force electrode as an example, the first force electrode 11 is electrically connected with the first force-sensing signal line 101 via a force-sensing bridge line 105. Similarly, such a design can reduce the manufacturing processes and improve the yield.

Figure 12:
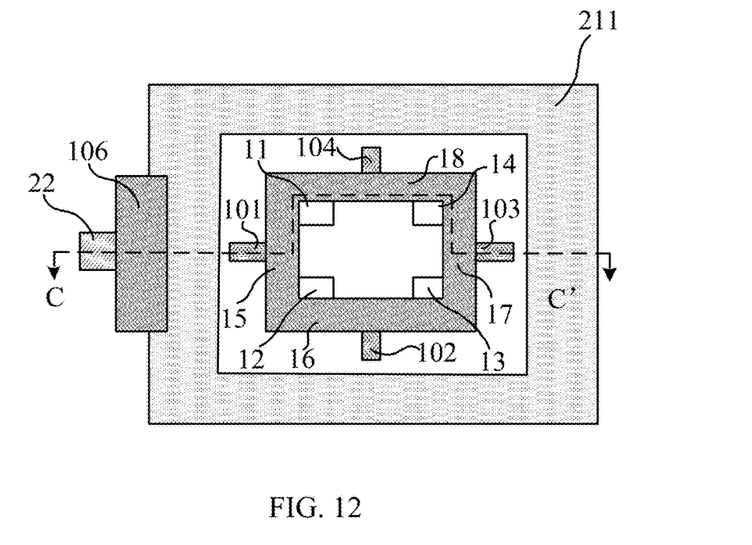
FIG. 12 is another structural schematic diagram showing connection relation of force sensors provided by an embodiment of the present disclosure.
Figure 13:
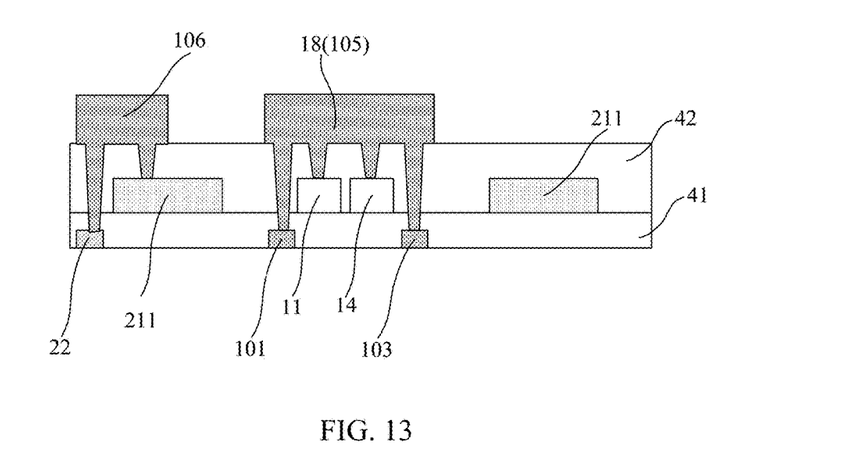
FIG. 13 is a cross-sectional view of CC' direction of FIG. 12 provided by an embodiment of the present disclosure.

In an embodiment, as shown in FIG. 12 and FIG. 13, FIG. 12 is a structural schematic diagram showing connection relation of force sensors provided by an embodiment of the present disclosure, FIG. 13 is a cross-sectional view of CC' direction of FIG. 12 provided by an embodiment of the present disclosure, the display panel also includes: a first force-sensing signal line 101, a second force-sensing signal line 102, a third force-sensing signal line 103 and a fourth force-sensing signal line 104.

The first force-sensing signal line 101 is electrically connected with the first force electrode 11 and the second force electrode 12 via the first electrode connecting line 15.

The second force-sensing signal line 102 is electrically connected with the second force electrode 12 and the third force electrode 13 via the second electrode connecting line 16.

The third force-sensing signal line 103 is electrically connected with the third force electrode 13 and the fourth force electrode 14 via the third electrode connecting line 17.

The fourth force-sensing signal line 104 is electrically connected with the fourth force electrode 14 and the first force electrode 11 via the fourth electrode connecting line 18.

As an example, as clearly shown in FIG. 12, the four electrode connecting lines 15-18 are connected to form a ring-like structure. The ring-like structure may be any structure having an enclosed shape. On the one hand, the four force electrodes 11-14 are connected with each other by the ring-like electrode connecting lines 15-18; and on the other hand, the force electrodes 11-14 are connected with the force-sensing signal lines 101-104 by the ring-like electrode connecting lines 15-18. In such a manner, the four electrode connecting lines are formed as a ring-like structure, the size is relatively large, which facilitates the preparation of subsequent processes, for example, it may be beneficial to etching and the like. It should be noted that, in order to clearly present a relation of each force layer, the ring-like electrode connecting lines 15-18 are provided with certain transparency in the figures.

Taking the first force electrode shown in FIG. 13 as an example, the first force electrode 11 is connected with the first force-sensing signal line 101 via the fourth electrode connecting line 18, and the first force electrode 11 is connected with the fourth force electrode 14 by the fourth electrode connecting line 18 (force-sensing bridge line 105). Comparing FIG. 13 with FIG. 11, it can be seen that, four electrode connecting lines electrically connect four force electrodes via one bridge, and meanwhile electrically connect the force-sensing signal line with the corresponding force electrode. Since the electrode connecting line and the pixel electrode are disposed in the same layer, the material may also be ITO. Therefore, for improving the ITO layer (a layer of pixel electrode 30), there is no need to add an entire group of mask processes including exposing, etching, developing and the like. Such a design can minimize the number of manufacturing processes to the maximum extent, thereby improving yield.

In an embodiment, in the display stage, the touch electrode 20 and the four force electrodes of the force sensor 10 are all multiplexed as common electrode for obtaining a common voltage signal. The touch electrode and the force electrode are disposed in the common electrode layer, therefore, film layers can be provided less due to the multiplexing, and the corresponding wiring can be provided simple.

In combination with the structure of the above-mentioned display panel, a force touch method is provided.

The force touch method further includes: in a display stage, the touch electrode and the four force electrodes of the force sensor obtain a common voltage signal.

In an embodiment, in combination with FIG. 12 and FIG. 13, in the touch stage, at least one of the four force electrodes of the force sensor is multiplexed as the touch electrode for obtaining a sensing electric signal on the multiplexed force electrode. The four force electrodes are formed a ring-like structure by four electrode connecting wires, in this case, one of the four force electrodes is multiplexed as the touch electrode, and the other three force electrodes can also sense corresponding touch signals via the corresponding electrode connecting wires so as to obtain the sensing electric signal on the four force electrodes. In such a manner, the number of drive ends (integrated circuit IC ends) opened can be decreased.

With reference to the structure of the display panel shown in FIG. 9 and FIG. 11, a force touch method is provided.

The force touch method further includes: in a touch stage, providing a touch electric signal to the touch electrode and at least one of the four force electrodes of the force sensor, obtaining sensing electric signals on each touch electrode and the force electrode multiplexed as the touch electrode.

In another embodiment, in the touch stage, the four force electrodes of the force sensor are all multiplexed as touch electrode for obtaining sensing electric signals on the four force electrodes. When the four force electrodes are all multiplexed as the touch electrode, the drive ends opened are provided more, however, since each force electrode can output a corresponding sensing electric signal at the same time, the required time for the touch control can be decreased, and the obtained sensing electric signal can achieve a higher accuracy.

With reference to the structure of the display panel shown in FIG. 12 and FIG. 13, a force touch method is provided.

The force touch method further includes: in a touch stage, providing a touch electric signal to the touch electrode and the four force electrodes of the force sensor, obtaining sensing electric signals on each touch electrode and the four force electrodes.

The principle of force sensor will be briefly described in the following.

Figure 14:
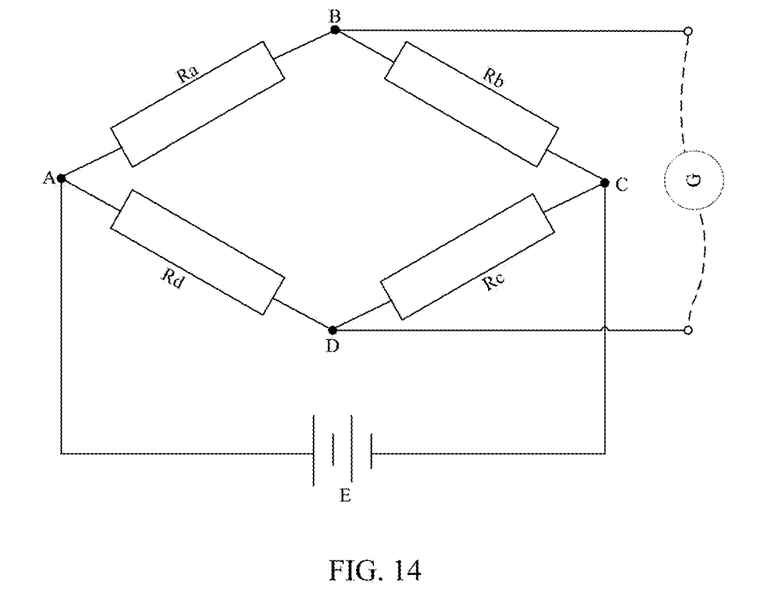
FIG. 14 is a schematic diagram of a Wheatstone bridge provided by an embodiment of the present disclosure.

The four force electrodes are equivalent to four resistors of a Wheatstone bridge, as shown in FIG. 14, FIG. 14 is a schematic diagram of a Wheatstone bridge provided by an embodiment of the present disclosure, the four resistors Ra, Rb, Rc and Rd of the Wheatstone bridge are connected with each other to form a quadrangle ABCD, the four resistors are referred to as four bridge arms of the Wheatstone bridge. A diagonal BD of the quadrangle ABCD is connected with a galvanometer G, referred to as a "bridge." Another diagonal AC of the quadrangle ABCD is connected with a power source E. When the power source E is turned on, electric current exists in each branch of the bridge circuit. When the resistances of the four resistors Ra, Rb, Rc and Rd satisfy a condition of Ra/Rb=Rd/Rc, a potential of point B is equal to a potential of point D, the current flowing through the galvanometer G in the bridge circuit is 0, and the pointer of the galvanometer G points to zero scale, at this moment, the Wheatstone bridge is in a balance state, and the condition of Ra/Rb=Rd/Rc is referred to as a Wheatstone bridge balance condition. When the resistances of the four resistors Ra, Rb, Rc and Rd do not satisfy the above-mentioned bridge balance condition, a potential of point B is not equal to a potential of point D, in this case, the current flowing through the galvanometer G in the bridge circuit is not 0, the pointer of the galvanometer G deflects, and a corresponding signal value is output.

When the Wheatstone bridge is provided on an object to be detected, for example a display panel, and the display panel is subjected to a force, the display panel is deformed, Ra, Rb, Rc, and Rd arranged on the display panel are all deformed, causing resistances thereof be changed correspondingly, thereby resulting in an unbalanced state of the bridge, the galvanometer G outputs a corresponding signal value. Since there exists a certain correspondence between the signal value output by the galvanometer and the force value, in the force detection process, a corresponding force value can be obtained by obtaining a signal value output by the galvanometer.

According to the above-mentioned Wheatstone bridge principle, the force sensor can be provided in the following three manners.

Figure 15:
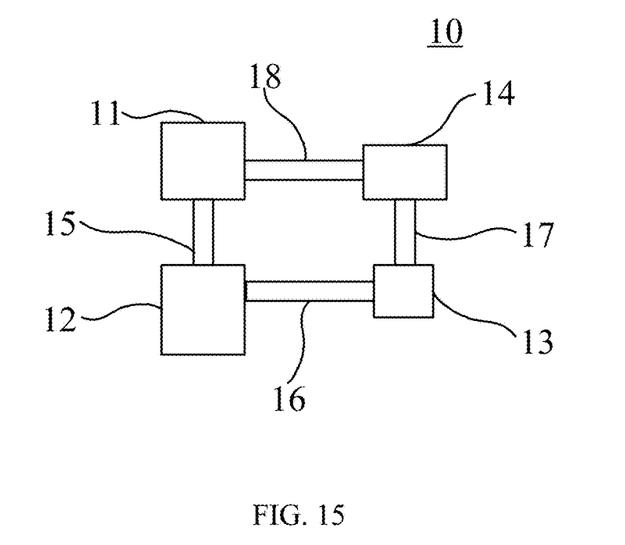
FIG. 15 is another structural schematic diagram of a force sensor provided by an embodiment of the present disclosure.

In a first manner, as shown in FIG. 15, FIG. 15 is another structural schematic diagram of a force sensor provided by an embodiment of the present disclosure, each of the four force electrodes of the force sensor has a different area.

A resistor of the first force electrode 11 is R1, a resistor of the second force electrode 12 is R2, a resistor of the third force electrode 13 is R3, and a resistor of the fourth force electrode 14 is R4. The force sensor 10 is arranged in the display area of the display panel, in an initial state (no force being applied), R1/R4≠R2/R3, at this moment, the galvanometer displays an initial signal value. When the display panel is subjected to a force, the display panel is deformed, the resistances of the resistors of the four force electrodes of the force sensor are correspondingly changed, by a detection of the galvanometer G, the detection signal is processed (for example, the initial signal value is subtracted), so that a corresponding force value can be obtained.

Figure 16:
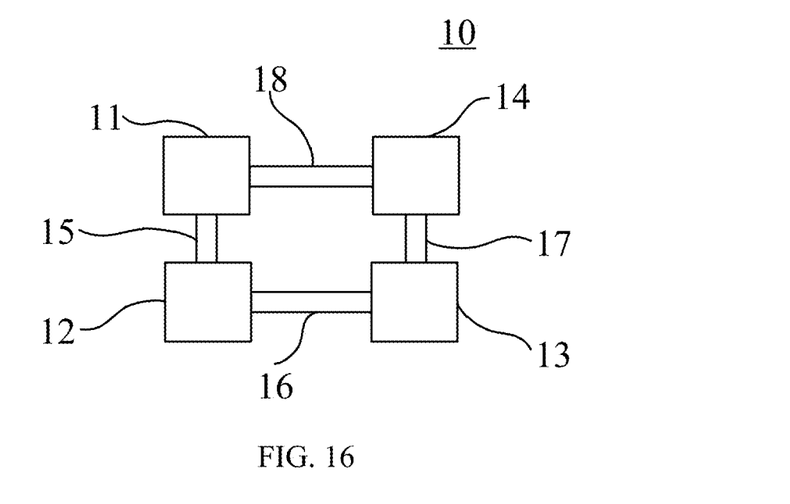
FIG. 16 is another structural schematic diagram of a force sensor provided by an embodiment of the present disclosure.

In a second manner, as shown in FIG. 16, FIG. 16 is another structural schematic diagram of a force sensor provided by an embodiment of the present disclosure, each of the four force electrodes of the force sensor has the same area. So that in a balance state (no force being applied), R1/R4=R2/R3, at this moment, the current flowing through the galvanometer G is 0, when the display panel is subjected to a force, the resistances of the resistors of the four force electrodes of the force sensor are correspondingly changed, and the galvanometer G outputs a corresponding signal value.

Each of the four force electrodes has the same area, that is, the resistances of the resistors of the four force electrodes are the same, so that in a balance state (no force being applied), the output signal value of the force sensor is 0, which is beneficial to measuring the signal output due to a strain, thereby improving the measurement accuracy of the output value of the force sensor when a strain exists.

Further, since the change of the resistance value of the force sensor is in direct proportion to the change of the deformation amount of the force sensor, the strain of the force electrode in a certain direction can be adjusted by adjusting the resistance value in this certain direction, so that a larger output value can be obtained, which is beneficial to eliminating interference signals, and the accuracy is high.

Figure 17:
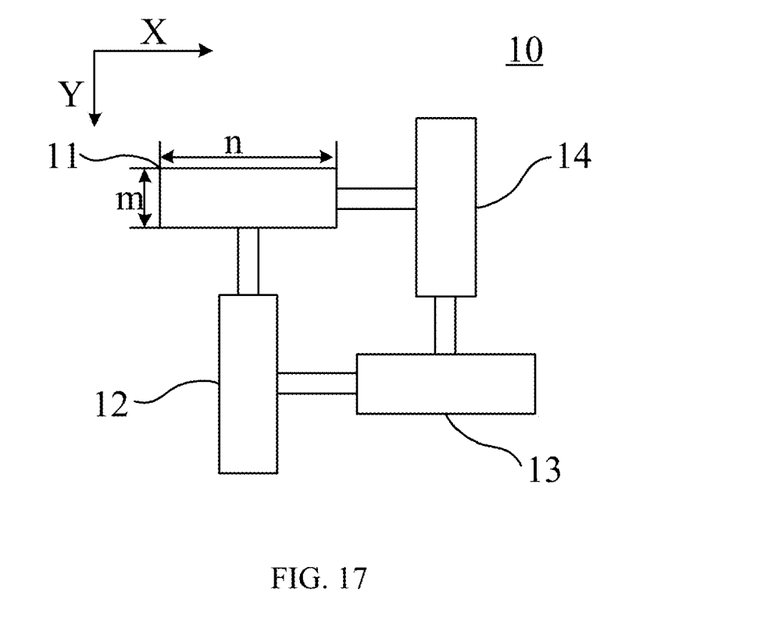
FIG. 17 is another structural schematic diagram of a force sensor provided by an embodiment of the present disclosure.

As shown in FIG. 17, FIG. 17 is another structural schematic diagram of a force sensor provided by an embodiment of the present disclosure, the display panel includes a first direction X and a second direction Y intersecting with the first direction X.

The shapes of the first force electrode 11, the second force electrode 12, the third force electrode 13, and the fourth force electrode 14 are all rectangular.

A component of a length of the first force electrode 11 in the first direction X is larger than a component of the length of the first force electrode 11 in the second direction Y.

A component of a length of the second force electrode 12 in the first direction X is smaller than a component of the length of the second force electrode 12 in the second direction Y.

A component of a length of the third force electrode 13 in the first direction X is larger than a component of the length of the third force electrode 13 in the second direction Y.

A component of a length of the fourth force electrode in the first direction X is smaller than a component of the length of the fourth force electrode 14 in the second direction Y.

Taking the first force electrode 11 as an example, the resistor of the first force electrode 11 is R1. The component n of the length of the first force electrode 11 in the first direction X is larger than the component m of the length of the first force electrode 11 in the second direction Y, so the first force electrode 11 mainly bear the strain in the first direction X. Similarly, the third force electrode 13 mainly bear the strain in the first direction X. The second force electrode 12 and the fourth force electrode 14 mainly bear the strain on the second direction Y, as for specific explanations, please refer to the above description with respect of the first force electrode 11, which will not be further described herein. In addition, as shown in FIG. 14, the two input ends A and C divide the circuit into two branches, one of the two branches has a current path of ABC, and the other one of the two branches has a current path of ADC. In each branch, since two adjacent force electrodes bear strains in different directions, so that there exists a maximal resistance difference in a certain direction, thereby making the deformation amount maximal, so that the signal value at the output end is larger and the sensitivity is higher.

Figure 18:
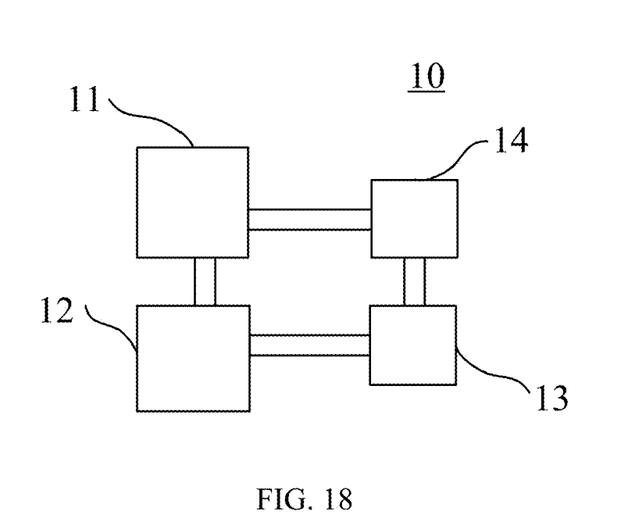
FIG. 18 is another structural schematic diagram of a force sensor provided by an embodiment of the present disclosure.

In a third manner, as shown in FIG. 18, FIG. 18 is another structural schematic diagram of a force sensor provided by an embodiment of the present disclosure, an area of the first force electrode is the same as an area of the second force electrode, an area of the third force electrode is the same as an area of the fourth force electrode, and the area of the first force electrode is different from the area of the third force electrode. So that in a balance state (no force being applied), R1/R4=R2/R3, at this moment, the current flowing through the galvanometer G is 0, when the display panel is subjected to a force, the resistances of the resistors of the four force electrodes of the force sensor are correspondingly changed, and the galvanometer G outputs a corresponding signal value.

In addition, in an embodiment, it is also possible that the area of the first force electrode is the same as the area of the fourth force electrode, the area of the third force electrode is the same as the area of the second force electrode, and the area of the first force electrode is different from the area of the third force electrode, in this case, in a balance state (no force being applied), a balance condition is R1/R2=R4/R3.

It should be noted that, the above-mentioned galvanometer can be construed as the detection circuit mentioned above.

Figure 19:
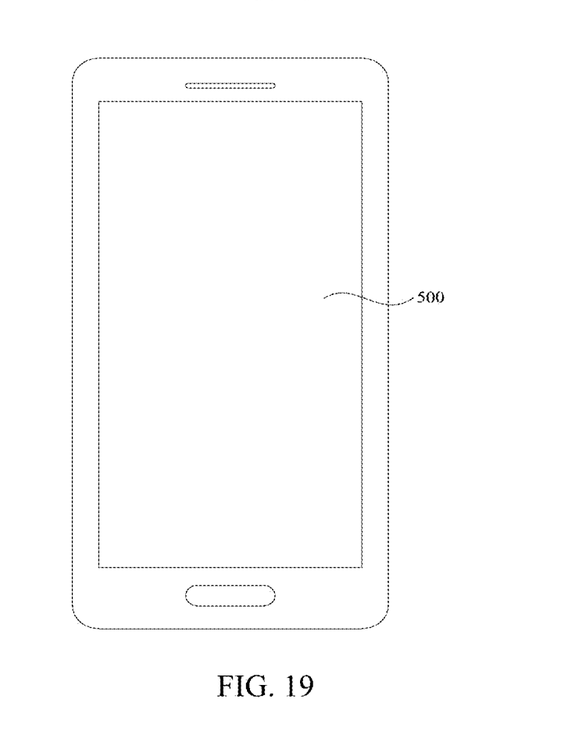
FIG. 19 is a structural schematic diagram of a display device provided by an embodiment of the present disclosure.

The present disclosure provides a display device, as shown in FIG. 19, FIG. 19 is a structural schematic diagram of a display device provided by an embodiment of the present disclosure. The display device 500 includes the display panel 1 described above. It should be noted that, FIG. 19 takes a cellphone as an example of the display device, however, the display device is not limited to a cellphone. The display device may include but is not limited to any electrical device having a display function, such as a personal computer (PC), a personal digital assistant (PDA), a wireless handheld device, a tablet computer, an mp4 player, a television and the like.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:
    a plurality of force sensors disposed in a display area, each of the plurality of force sensors comprising four force electrodes sequentially interconnected end-to-end, which are a first force electrode, a second force electrode, a third force electrode and a fourth force electrode;
    a touch electrode comprising a plurality of touch electrode blocks, wherein one or more of the plurality of touch electrode blocks are frame-shaped electrodes, and each of the plurality of force sensors corresponds to a respective one of the frame-shaped electrodes, each of the frame-shaped electrodes is provided with a hollow area, and each of the plurality of force sensors is disposed in the hollow area of the respective frame-shaped electrode.

2. The display panel according to claim 1, wherein
    the plurality of touch electrode blocks are arranged in an array,
    in each odd-numbered row of the array, each odd-numbered touch electrode block is one of the frame-shaped electrodes,
    in each even-numbered row of the array, each even-numbered touch electrode block is one of the frame-shaped electrodes.

3. The display panel according to claim 1, wherein
    the four force electrodes of each of the plurality of force sensors are disposed in a same layer as the touch electrode.

4. The display panel according to claim 1, wherein the display panel further comprises:
    a first electrode connecting line, via which the first force electrode is connected with the second force electrode;
    a second electrode connecting line, via which the second force electrode is connected with the third force electrode;
    a third electrode connecting line, via which the third force electrode is connected with the fourth force electrode;
    a fourth electrode connecting line, via which the fourth force electrode is connected with the first force electrode; and
    a plurality of pixel electrodes,
    wherein the first electrode connecting line, the second electrode connecting line, the third electrode connecting line and the fourth electrode connecting line are all disposed in the same layer as the pixel electrodes.

5. The display panel according to claim 4, wherein the display panel further comprises:
    a first force-sensing signal line electrically connected with the first force electrode and the second force electrode via the first electrode connecting line,
    a second force-sensing signal line electrically connected with the second force electrode and the third force electrode via the second electrode connecting line,
    a third force-sensing signal line electrically connected with the third force electrode and the fourth force electrode via the third electrode connecting line, and
    a fourth force-sensing signal line electrically connected with the fourth force electrode and the first force electrode via the fourth electrode connecting line.

6. The display panel according to claim 1, wherein the display panel further comprises:
    a voltage application circuit, configured to apply a voltage to the force sensors, a first input end of the voltage application circuit being electrically connected with the first force electrode, a second input end of the voltage application circuit being electrically connected with the third force electrode; and
    a detection circuit, configured to detect an output signal of the force sensors, a first output end of the detection circuit being electrically connected with the second force electrode, a second output end of the detection circuit being electrically connected with the fourth force electrode.

7. The display panel according to claim 1, wherein the display panel further comprises:
    a plurality of touch signal lines, the plurality of touch signal lines one-to-one corresponding to and being electrically connected with the plurality of touch electrode blocks;

a first force-sensing signal line electrically connected with the first force electrode,
a second force-sensing signal line electrically connected with the second force electrode,
a third force-sensing signal line electrically connected with the third force electrode,
a fourth force-sensing signal line electrically connected with the fourth force electrode;
wherein the first force-sensing signal line, the second force-sensing signal line, the third force-sensing signal line and the fourth force-sensing signal line are all disposed in the same layer as the touch signal lines.

8. The display panel according to claim 1, wherein areas of the four force electrodes of each of the plurality of force sensors each are different from one another.

9. The display panel according to claim 1, wherein areas of the four force electrodes of each of the plurality of force sensors are equal.

10. The display panel according to claim 9, wherein the display panel comprises a first direction and a second direction intersecting with the first direction,
the first force electrode, the second force electrode, the third force electrode and the fourth force electrode are all rectangular-shaped,
a component of a length of the first force electrode in the first direction is larger than a component of the length of the first force electrode in the second direction; a component of a length of the second force electrode in the first direction is smaller than a component of the length of the second force electrode in the second direction; a component of a length of the third force electrode in the first direction is larger than a component of the length of the third force electrode in the second direction; and a component of a length of the fourth force electrode in the first direction is smaller than a component of the length of the fourth force electrode in the second direction.

11. The display panel according to claim 1, wherein an area of the first force electrode is the same as an area of the second force electrode, and an area of the third force electrode is the same as an area of the fourth force electrode.

12. The display panel according to claim 1, wherein in a display stage, the four force electrodes of each of the force sensors, and the touch electrode each are multiplexed as a common electrodes for obtaining a common voltage signal.

13. The display panel according to claim 1, wherein in a touch stage, at least one of the four force electrodes of each of the force sensors is multiplexed as a touch electrode for obtaining a sensing electric signal of the force electrodes being multiplexed.

14. The display panel according to claim 1, wherein in a touch stage, the four force electrodes of each of the force sensors are all multiplexed as touch electrodes for obtaining sensing electric signals of the four force electrodes being multiplexed.

15. A display device comprising a display panel, wherein the display panel comprises:
a plurality of force sensors disposed in a display area, each of the plurality of force sensors comprising four force electrodes sequentially interconnected end-to-end, which are a first force electrode, a second force electrode, a third force electrode and a fourth force electrode;
a touch electrode comprising a plurality of touch electrode blocks, wherein one or more of the plurality of touch electrode blocks are frame-shaped electrodes, and each of the plurality of force sensors corresponds to a respective one of the frame-shaped electrodes, each of the frame-shaped electrodes is provided with a hollow area, and each of the plurality of force sensors is disposed in the hollow area of the respective frame-shaped electrode.

16. A force touch method, applied in a display panel, wherein the display panel comprises:
a plurality of force sensors disposed in a display area, each of the plurality of force sensors comprising four force electrodes sequentially interconnected end-to-end, which are a first force electrode, a second force electrode, a third force electrode and a fourth force electrode;
a touch electrode comprising a plurality of touch electrode blocks, wherein one or more of the plurality of touch electrode blocks are frame-shaped electrodes, and each of the plurality of force sensors corresponds to a respective one of the frame-shaped electrodes, each of the frame-shaped electrodes is provided with a hollow area, and each of the plurality of force sensors is disposed in the hollow area of the respective frame-shaped electrode,
wherein the force touch method comprises:
obtaining an output signal of the force sensors in a force touch stage.

17. The force touch method according to claim 16, wherein the force touch method further comprises:
in the touch stage, providing a touch electric signal to the touch electrode and at least one of the four force electrodes of each of the force sensors, obtaining sensing electric signals of the touch electrode and the force electrode multiplexed as the touch electrode.

18. The force touch method according to claim 16, wherein the force touch method further comprises:
in the touch stage, providing a touch electric signal to the touch electrode and the four force electrodes of each of the force sensors, obtaining sensing electric signals of the touch electrode and the four force electrodes.

19. The force touch method according to claim 16, wherein the force touch method further comprises:
in a display stage, obtaining a common electrode signal by the touch electrode and the four force electrodes of each of the force sensors.

* * * * *